United States Patent [19]

Cho et al.

[11] 4,034,299

[45] July 5, 1977

[54] AUDIO SIGNAL QUALITY INDICATOR

[75] Inventors: Susumu Cho, Elk Grove Village; Paul Milton Erickson, Oak Park; Gary Raymond Reynolds, Streamwood, all of Ill.

[73] Assignee: Motorola, Inc., Schaumburg, Ill.

[22] Filed: Dec. 29, 1975

[21] Appl. No.: 645,002

[52] U.S. Cl. .............................. 325/363; 324/77 F; 325/304

[51] Int. Cl.² ..................... H04B 1/16; H04B 17/00

[58] Field of Search .......... 325/304, 363, 349, 489, 325/344, 484, 496, 31, 56, 67, 478; 324/77 A, 77 E, 77 F

[56] References Cited

UNITED STATES PATENTS

| 3,729,682 | 4/1973 | Elder | 325/304 |
|---|---|---|---|
| 3,775,689 | 11/1973 | Greenwald | 325/363 |
| 3,916,316 | 10/1975 | Hearn et al. | 325/304 |
| 3,919,640 | 11/1975 | Simciak | 325/67 |
| 3,984,776 | 10/1976 | Stedman | 325/304 |

*Primary Examiner*—Benedict V. Safourek
*Assistant Examiner*—Marc E. Bookbinder
*Attorney, Agent, or Firm*—Victor Myer; James W. Gillman

[57] ABSTRACT

An FM radio receiver with a discriminator having connected thereto a plurality of bandpass filters, each tuned to pass a different portion of the audio spectrum from the discriminator, and circuitry connected to the bandpass filters for selecting the filter with the lowest output signal which is an indication of the amplitude of the noise and, hence, the quality of the signal being received by the receiver.

4 Claims, 2 Drawing Figures

AUDIO SIGNAL QUALITY INDICATOR

BACKGROUND OF THE INVENTION

1. Field of the Invention

In FM receivers, it is a well known fact that the level of the noise emanating from the discriminator is inversely proportional to the strength, or quality, of the signal being received by the receiver and, hence, the level of the noise is a valid indication of the strength, or quality, of the signal. The major problem determining the amplitude of the noise signal emanating from the discriminator is in measuring the noise with no other signals present. If any audio or other interference is present when the noise is being measured, the measurement will be too high and will be a false indication of the true strength or quality of the signal being received.

2. Description of the Prior Art

Typically, in the prior art devices utilizing a signal quality indicator, the circuitry monitored the entire audio output of the discriminator. These systems can obtain a fairly accurate reading of the noise level if the audio contains periodic pauses. However, if there are only minor pauses in the audio, this prior art system is highly inaccurate. For example, when continuous tones or data are received because there are no pauses or valleys, the prior art systems can not obtain a reading of the noise level. A prior art system of this type is described in U.S. Pat. No. 3,729,681, entitled "Receiver Selecting Arrangement," issued Apr. 24, 1973.

In another type of signal quality indicator, circuitry is provided to monitor the output of the discriminator above the audio spectrum. Circuitry utilizing this type of signal quality indicator is described in U.S. Pat. No. 3,769,592, entitled "Squelch Circuit with Time Delay Variable in Accordance with Strength of Received Signal," issued Oct. 30, 1973. This type of signal quality indicator is very accurate and reliable but is not useful in a voting system or receiver selecting system, such as that described in the U.S. Pat. No. 3,729,681 (cited above) since telephone lines, which are utilized to carry the audio signals from the receiver to a central selecting site, have a limited bandpass of approximately 300 to 3,000 cycles. Therefore, the discriminator output above the audio spectrum is removed by telephone lines and not available as an indicator of signal quality.

SUMMARY OF THE INVENTION

The present invention pertains to signal quality indicator means for a radio receiver including a discriminator designed to pass a predetermined band of audio signals, which indicator means includes bandpass filter means having a bandpass substantially smaller and lying substantially within the predetermined band of audio signals, coupled to the discriminator means and means connected to the bandpass filter means for providing an output signal indicative of the amplitude of the audio signal within the bandpass of the bandpass filter means.

It is an object of the present invention to provide a new and improved signal quality indicator for an FM radio receiver.

It is a further object of the present invention to provide a new and improved signal quality indicator which provides an accurate indication of the noise emanating from a discriminator as long as the audio in some portion of the audio spectrum periodically goes to a null.

It is a further object of the present invention to provide a new and improved signal quality indicator which provides an accurate indication of the noise level when receiving continuous tones or data.

These and other objects of this invention will become apparent to those skilled in the art upon consideration of the accompanying specifications, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
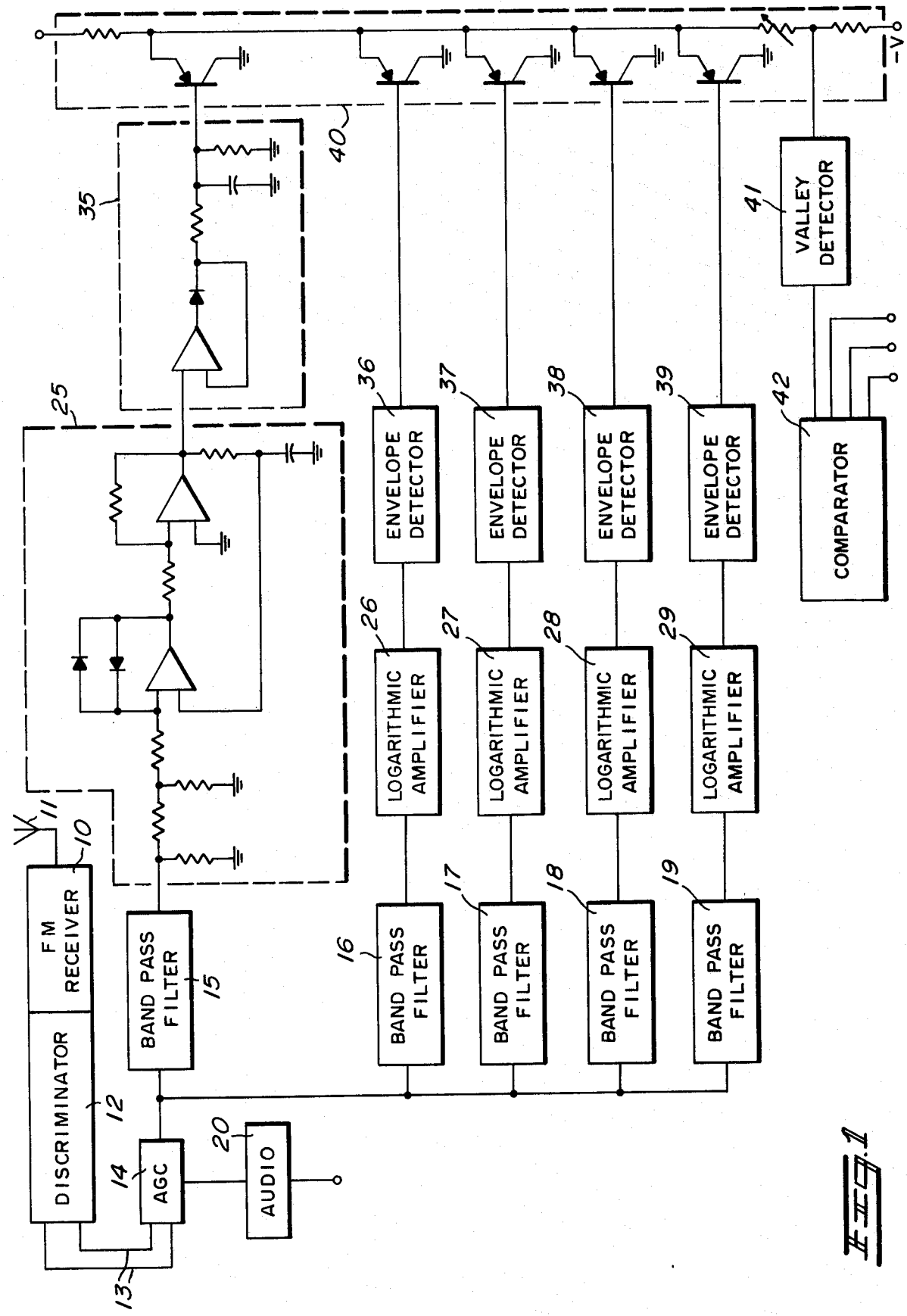
FIG. 1 is a block schematic diagram of a signal quality indicator embodying the present invention.

Referring specifically to FIG. 1, a single FM receiver with an audio signal quality indicator embodying the present invention attached thereto is illustrated. The receiver and audio signal quality indicator are suitable for use in a voting system, such as that described in the co-pending application entitled "Receiver Voting System," Ser. No. 604,562, filed Aug. 14, 1975, now U.S. Pat. No. 4,013,962 and assigned to the same assignee. The above described application discloses in detail the operation of a voting system and illustrates a use of the present indicator. Since the voting system is described in detail in the above mentioned co-pending application, further elaboration thereon will not be included herein.

An FM receiver 10 having an antenna 11 for receiving signals thereon includes a discriminator 12 the output of which is connected through a connecting link, such as telephone lines 13, to the present centrally located control system. In FIG. 1 the telephone lines 13 are connected directly to an automatic gain control circuit 14 the output of which is connected to a plurality of bandpass filters 15–19. An audio circuit 20 is also connected to the automatic gain control circuit 14 and supplies audio to the system if the FM receiver 10 is selected by the voting system. The automatic gain control circuit 14 supplies a relatively constant level signal to the bandpass filters 15–19 and may be set initially, for example, by supplying a signal to the FM receiver 10 of known amplitude so that all of the various receivers in the system will have substantially the same gain when signals with similar amplitudes are applied thereto.

In the present embodiment, each of the bandpass filters 15–19 is tuned to pass a different segment of the audio spectrum supplied by the discriminator 12. The audio spectrum of an FM discriminator in a communications type receiver is generally 300 to 3,000 Hz and, if the connecting link is a pair of telephone lines (as in the present embodiment) the bandpass of the telephone lines is generally 300 to 3,000 Hz so that they operate as a bandpass filter to limit the audio spectrum.

In the present embodiment, five bandpass filters 15–19 are illustrated so that a bandpass of approximately 500 Hz for each of the filters 15–19 will approximately cover the audio spectrum. It should, of course, be understood that it is not necessary to cover the entire audio spectrum and any number of bandpass filters with a bandpass substantially smaller than the audio spectrum may be utilized. If bandpass filters having a total bandpass less than the audio spectrum are utilized, it is generally preferable to monitor the upper end of the audio spectrum since it has been found that pauses in the audio are more likely to appear at the upper end of the audio spectrum, as will become more apparent presently.

Each of the bandpass filters 15–19 is connected to a logarithmic amplifier 25–29 respectively, and the outputs of the logarithmic amplifiers 25–29 are connected to envelope detectors 35–39, respectively. It should be understood that all references to logarithmic amplifiers include other forms of compression amplifiers and any amplifiers for obtaining appropriate nonlinear compression characteristics. The output of the envelope detectors 35–39 are applied to five inputs of a lowest signal detector 40, designed to receive only the lowest signal output from the envelope detectors 35–39. An output of the lowest signal detector 40 is applied to a valley detector 41 which supplies a DC signal indicative of the noise level output and, hence, the quality or strength of the signal being received by the FM receiver 10, to a comparator 42. The comparator 42 has a plurality of inputs each of which are connected to similar FM receivers and audio signal quality indicators (not shown) so that the comparator can compare the DC output signals and select the receiver receiving the strongest signal.

The logarithmic amplifiers 25–29 are all similar and only the amplifier 25 is illustrated in detail. Also, the envelope detectors 35–39 are all similar and only the envelope detector 35 is illustrated in detail. While a specific log amplifier 25 and envelope detector 35 are illustrated, it should be understood that other log amplifiers and envelope detectors might be utilized if desired and the present ones are illustrated only because of their simplicity of construction and improved operating characteristics. Further, while a specific lowest signal detector 40 is illustrated, it should be understood that other detectors that perform the same functions might be devised by those skilled in the art and that the detector 40 in illustrated only because of its simplicity of operation.

Figure 2:
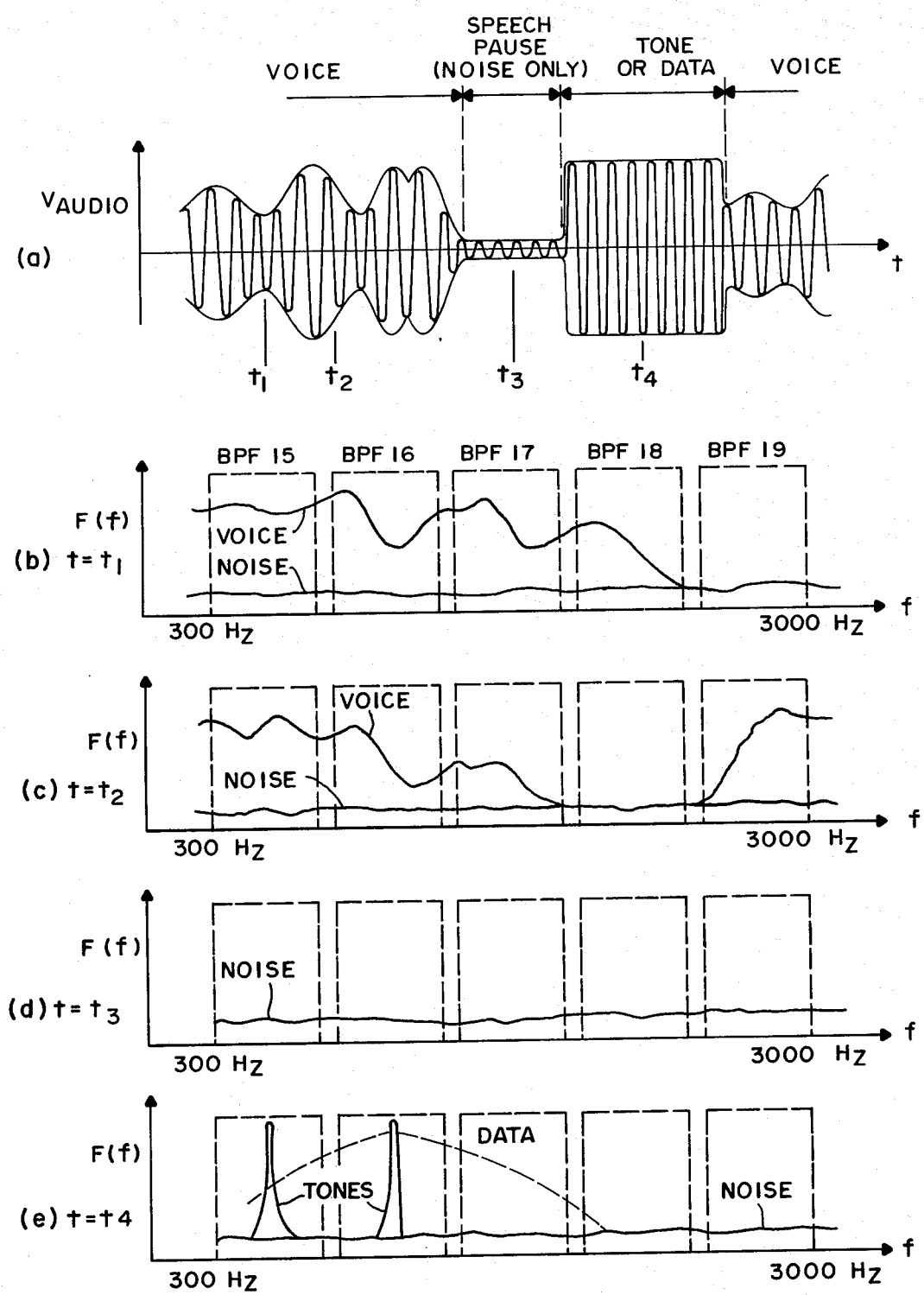
FIG. 2 illustrates a series of wave forms present at various points in the circuitry of FIG. 1.

Referring to FIG. 2, wave form (a) of FIG. 2 illustrates a typical audio signal emanating from the discriminator 12 and containing voice and tones or data. Wave forms b through e illustrate the frequency spectrum (typically) of the wave form (a) at times T1–T4. In each of the wave forms b through e of FIG. 2, the portions of the audio spectrum passed by each of the bandpass filters 15–19 is approximately outlined in dotted lines and designated BPF15–BPF19. As previously stated, each of the filters 15–19 have a bandpass of approximately 500 Hz and the center frequencies thereof are spaced apart throughout the audio spectrum so that the five filters 15–19 approximately cover the entire audio spectrum of the discriminator 12. It can be seen from the wave forms b through e of FIG. 2 that an accurate indication of the noise level is obtained by taking the output of the bandpass filter 19 at time T1, the output of bandpass filter 18 at time T2, the output of any one of the bandpass filters 15–19 at times T3 and the output of the bandpass filter 19 at time T4. It can further be seen from FIG. 2 that the output of either of the bandpass filters 18 or 19 provides a more accurate indication of the noise level than a bandpass filter which monitors the entire audio spectrum. Because minor nulls can appear at specific frequencies throughout ordinary speech without a pause in the speech actually occurring, one or more bandpass filters, each tuned to pass less than the entire audio spectrum, can be utilized to monitor the audio spectrum and provide an accurate indication of the noise level. Also when continuous tones or data are received they only occur in a portion of the audio spectrum, as shown in FIG. 2 waveform (e), and the bandpass filters in the upper portion of the spectrum (on the clear portions) are monitored. Since the minor nulls can appear anywhere in the audio spectrum and can be any width (i.e. any frequency or number of frequencies) the accuracy or reliability of the noise level indication will increase with the number of bandpass filters used and will decrease as the width of the bandpass filters increases. Obviously, the number of filters must be kept within a reasonable amount since the cost can outweigh the advantages obtained.

Accordingly a new and improved signal quality indicator is disclosed which provides an accurate and reliable indication of the noise level at the output of a discriminator so that the strength or quality of the signal being received by the receiver can be determined. Further, the plurality of logarithmic amplifiers and envelope detectors can be provided in integrated form so that they are relatively inexpensive and easy to manufacture. While we have shown and described a specific embodiment of the present invention, further modifications and improvements will occur to those skilled in the arts. We desire it to be understood, therefore, that this invention is not limited to the particular form shown and we intend in the appended claims to cover all modifications which do not depart from the spirit and scope of this invention.

I claim:

1. Signal quality indicator means for a radio receiver designed to pass a predetermined band and having a discriminator with an output of audio signals, said indicator means comprising:
    a. a plurality of bandpass filters each having a bandpass substantially smaller and lying substantially within the predetermined band of audio signals, said bandpass filters being coupled to the output of the discriminator, and each of said bandpass filters passing a portion of the predetermined band of audio signals which is spaced from the portion passed by each of the other bandpass filters; and
    b. means connected to said bandpass filters for selecting the bandpass filter with the lowest amplitude output and providing an output signal indicative of the amplitude thereof.

2. Signal quality indicator means as claimed in claim 1 including in addition automatic gain control circuitry coupled between the output of the discriminator and the plurality of bandpass filters for supplying a relatively constant amplitude signal to the bandpass filters.

3. Signal quality indicator means as claimed in claim 1 wherein the means for selecting the bandpass filter includes a plurality of logarithmic amplifiers connected to a plurality of envelope detectors, one each respectively with each of said logarithmic amplifiers being connected to one of the bandpass filters, and a lowest signal detector connected to each of said envelope detector.

4. Signal quality indicator means as claimed in claim 3 including in addition valley detector means connected to the lowest signal detector for providing a DC output voltage indicative of the noise level at the output of the discriminator.

* * * * *